US012616166B2

(12) United States Patent
Xue et al.

(10) Patent No.: US 12,616,166 B2
(45) Date of Patent: May 5, 2026

(54) TEST APPARATUS FOR DUST-EXPOSING BREATH OF ANIMALS AND TEST METHOD THEREOF

(71) Applicant: ANHUI UNIVERSITY OF SCIENCE AND TECHNOLOGY, Huainan (CN)

(72) Inventors: Sheng Xue, Huainan (CN); Fulin Cai, Huainan (CN); Mei Zhang, Huainan (CN); Yafeng Liu, Huainan (CN); Jiawei Zhou, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 317 days.

(21) Appl. No.: 18/579,717

(22) PCT Filed: Dec. 6, 2023

(86) PCT No.: PCT/CN2023/136617
§ 371 (c)(1),
(2) Date: Jan. 16, 2024

(87) PCT Pub. No.: WO2025/076971
PCT Pub. Date: Apr. 17, 2025

(65) Prior Publication Data
US 2025/0386795 A1 Dec. 25, 2025

(30) Foreign Application Priority Data

Oct. 9, 2023 (CN) .......................... 202311304707.7

(51) Int. Cl.
*A01K 1/03* (2006.01)
*A01K 1/035* (2006.01)
*A01K 29/00* (2006.01)

(52) U.S. Cl.
CPC ............ *A01K 1/0313* (2025.08); *A01K 1/035* (2013.01); *A01K 29/004* (2025.08); *A01K 29/005* (2013.01)

(58) Field of Classification Search
CPC ........ A01K 1/0313; A01K 1/035; A01K 1/31; A01K 29/004; A01K 29/005; A61D 7/00; B01L 1/00
See application file for complete search history.

(56) References Cited

U.S. PATENT DOCUMENTS 3,107,650 A * 10/1963 Zhang ...................... A01K 1/01
119/417
3,803,571 A * 4/1974 Luz ...................... A01K 29/005
377/16
(Continued)

FOREIGN PATENT DOCUMENTS

CN 109512541 A * 3/2019 ............... A61D 7/00
CN 109512545 A * 3/2019 ............... A61D 7/00
(Continued)

*Primary Examiner* — Ebony E Evans
(74) *Attorney, Agent, or Firm* — Cowan, Liebowitz & Latman, P.C.; Mark Montague

(57) ABSTRACT

Provided are a test apparatus for dust-exposing breath of animals and a test method thereof. The test apparatus includes a constant temperature and humidity test box internally provided with a test chamber and provided with a dust inlet connected to a dust conveying device. The test chamber separated into a cleaning area and an activity area, and a blowing device is arranged in the cleaning area. The test method includes following steps: step S1: a test animal is placed in the activity area; step S2: dust is introduced and the blowing device is turned on; step S3: a temperature and a humidity are adjusted; step S4: the test animal is taken out to weigh and step S5: steps S1 to S4 are repeated, blood of the test animal is drawn after days for biochemical index assay, and a test cycle is completed.

20 Claims, 1 Drawing Sheet

(56) References Cited

U.S. PATENT DOCUMENTS

| | | | | | |
|---|---|---|---|---|---|
| 4,154,196 A | * | 5/1979 | Gass | ....................... | A01K 1/031 119/417 |
| 4,448,150 A | * | 5/1984 | Catsimpoolas | ........ | A01K 1/031 250/221 |
| 4,785,765 A | * | 11/1988 | Campbell | .............. | A01K 1/031 119/417 |
| 4,968,974 A | * | 11/1990 | Sakano | .................. | A01K 1/031 250/221 |
| 5,163,380 A | * | 11/1992 | Duffy | ..................... | A01K 1/031 119/420 |
| 5,499,609 A | * | 3/1996 | Evans | .................. | A01K 1/0356 119/61.51 |
| 6,234,111 B1 | * | 5/2001 | Ulman | ................... | A01K 1/031 119/51.02 |
| 6,651,587 B1 | * | 11/2003 | DeFord | .................... | A61D 3/00 119/420 |
| 7,086,350 B2 | * | 8/2006 | Tecott | .................... | A01K 1/031 119/421 |
| 7,905,201 B2 | * | 3/2011 | Greene | ................ | A01K 23/005 119/421 |
| 9,877,460 B2 | * | 1/2018 | Mizumachi | ............ | A01K 1/031 |
| 12,257,451 B2 | * | 3/2025 | Sunden | ................ | A61N 5/0625 |
| 2025/0386795 A1 | * | 12/2025 | Xue | ..................... | A01K 1/0313 |

FOREIGN PATENT DOCUMENTS

| | | | | | | |
|---|---|---|---|---|---|---|
| CN | 109855894 A | * | 6/2019 | | | |
| CN | 209802930 U | * | 12/2019 | | | |
| CN | 112304850 A | * | 2/2021 | ............ | G01N 67/02 |
| CN | 114568385 A | * | 6/2022 | ............ | A01K 67/02 |
| CN | 114931454 A | * | 8/2022 | ............ | A61B 5/445 |
| KR | 101088864 B1 | * | 12/2011 | .............. | G01N 1/24 |

* cited by examiner

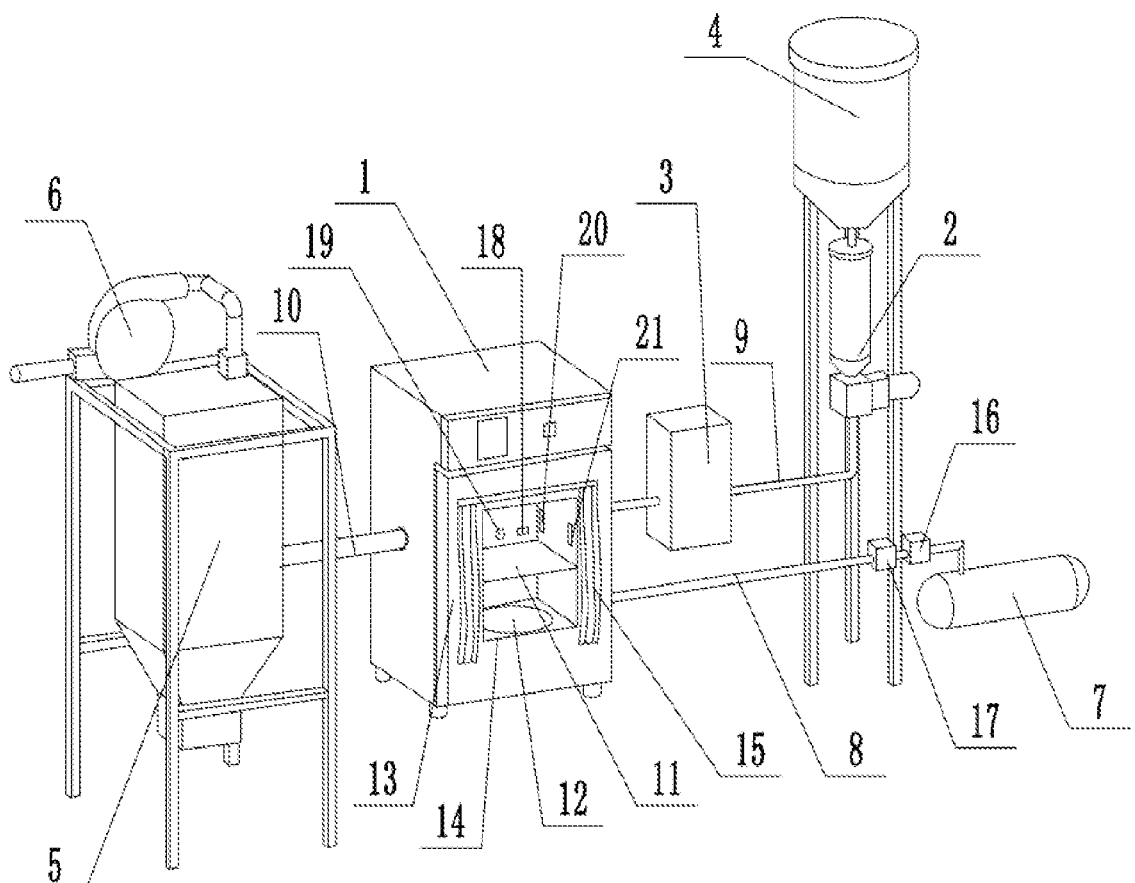

1

TEST APPARATUS FOR DUST-EXPOSING BREATH OF ANIMALS AND TEST METHOD THEREOF

CROSS REFERENCE TO RELATED APPLICATION

This application is a national stage application of International Patent Application No. PCT/CN2023/136617, filed on Dec. 6, 2023, which claims priority of the Chinese Patent Application No. 202311304707.7, filed on Oct. 9, 2023, both of which are incorporated by references in their entities.

TECHNICAL FIELD

The present disclosure belongs to the technical field of pneumoconiosis animal simulation tests, and particularly relates to a test apparatus dust-exposing breath of animals and a test method thereof.

BACKGROUND

In the process of coal mining, a large amount of dust is generated, resulting in the polluted roadway environment. Long-term inhalation of dust by workers causes pneumoconiosis, which seriously threatens the occupational safety and health of workers and restricts the development of underground coal mining. Due to the limitation of experiments, it is difficult to carry out the dust inhalation experiment on coal miners, and thus it is impossible to continue the follow-up pathological research. To this end, researchers began to use pneumoconiosis rats to simulate the effects of dust on function of human body during inhalation of dust. For example, in Chinese Patent Application No. 201920282288.4 which has the title of animal feeding test apparatus for feeding animals exposed to dust, the patent discloses a method of putting rats into a sealed cabin and then feeding dust into the cabin to simulate the environment in the mine. An excrement leakage isolation net and a particulate matter concentration sensor are arranged in the sealed cabin, and the excrement leakage isolation net divides an inner chamber of the sealed cabin into upper and lower areas. The upper area is configured for the activities and feeding of rats, and the lower area is provided with a excrement conveyor to convey excrement out of the sealed cabin. A dust conveying device is connected outside the sealed cabin to provide dust with a preset concentration into the cabin, so as to simulate the environment in the mine. However, there are many problems in the above patent: 1, with the increase of test time, floating dust will gradually fall and then deposit on a bottom plate of the cabin, resulting the contact effect between the rats and dust worse, so that the process that human body is exposed to the dust cannot be simulated effectively, and the subsequent research cannot be carried out effectively; and 2, there is not a simulation of harmful gases and other components in coal mines, so it is impossible to explore the harm of the harmful gases to human body. Moreover, pneumoconiosis is often caused by many factors such as dust and harmful gases, so the above patent cannot really determine the harm of the environment in the coal mine to the rats.

SUMMARY

An objective of the present disclosure is to provide a test apparatus for dust-exposing breath of animals and a test method thereof. After dust is provided into a test chamber, a blowing device can ensure that the dust is always diffused in the test chamber, such that the contact effect between a test animal and the dust is improved, the process that the human body is exposed to the dust can be well simulated, and. a test result is more realistic.

The technical solution adopted by the present disclosure is a test apparatus for dust-exposing breath of animals, including a constant temperature and humidity test box internally provided with a test chamber. The constant temperature and humidity test box is provided with a dust inlet communicated with the test chamber, and the dust inlet is connected to a dust conveying device; the test chamber is internally provided with an excrement leakage isolation net separating the test chamber into a cleaning area and an activity area configured for activities of the animals; the activity area and the cleaning area are distributed from up to down; and a blowing device configured for blowing dust and a tray configured for receiving excrement and urine are arranged in the cleaning area, and the constant temperature and humidity test box is provided with a box door communicated with the activity area and the cleaning area.

The present disclosure has the characteristics that:

Preferably, the constant temperature and humidity test box is provided with an exhaust gas inlet which is communicated with the test chamber and the exhaust gas inlet is connected to an exhaust gas supplying device.

Preferably, the exhaust gas supplying device includes an exhaust gas storage tank filled with exhaust gas mixture, and a flowmeter and a flow control valve are connected between the exhaust gas storage tank and the exhaust gas inlet in sequence.

Preferably, a dust concentration monitor, an exhaust gas concentration monitor, a thermometer and a hygrometer are arranged in the test chamber Preferably, the dust conveying device includes a powder feeder and a crusher located above the powder feeder, a powder outlet of the crusher is communicated with a powder container of the powder feeder.

Preferably, a dryer is connected between the powder feeder and the dust inlet.

Preferably, the constant temperature and humidity test box is provided with an exhaust port which is communicated with the test chamber and the exhaust port is connected to a dust removing device.

Preferably, the box door is provided with a transparent window configured for light to penetrate into the activity area and the cleaning area, and a curtain is arranged on the transparent window.

A test method for dust-exposing breath of animals is also disclosed by means of the test apparatus dust-exposing breath of animals described above, including following steps:

step S1: opening the box door, placing a test animal and the tray in the activity area and the cleaning area of the test chamber, respectively, and closing the box door;

step S2: turning on the dust conveying device to introduce dust with a preset concentration into the test chamber, turning off the dust conveying device after introduction is finished, and turning on the blowing device to raise the dust;

step S3: adjusting a temperature and a humidity in the test chamber to a preset temperature and a present humidity;

step S4: after reaching a preset test time every day, opening the box door to take the test animal out, cleaning the tray and the dust in the test chamber, weighing the test animal taken out, and observing eating and activity conditions of the test animal; and step S5: repeating steps S1 to S4, drawing blood of the test animal after days for biochemical index assay, and completing a test cycle.

Preferably, in step S2, when the dust conveying device is opened, an exhaust gas supplying device is turned on to introduce exhaust gas mixture with a preset concentration into the test chamber, and after introduction of each of the dust conveying device and the exhaust gas conveying device is finished, the blowing device is turned on to raise the dust.

The present disclosure has the beneficial effects that:

1, in the present disclosure, after the dust is provided into the test chamber in the constant temperature and humidity test box, the blowing device is turned on to raise the dust in the test chamber, making the dust always diffuse in the test chamber to avoid a situation that the process that the human body is exposed to the dust cannot be better simulated due to the fact that the dust deposit makes the contact effect between the test animal and the dust worse;

2, in the present disclosure, in addition to providing simulated dust into the test chamber in the constant temperature and humidity test box, simulated exhaust gas is also provided into the test chamber, such that the simulated environment where the test animal is located is more similar to the real environment, the simulation test is more accurate, the authenticity of the simulation is improved;

3, in the present disclosure, a dryer is provided between the powder feeder and the dust inlet, which can pre-dry the dust to reduce the effect on the humidity of the test environment; and 4, in the present disclosure, a transparent window and a curtain are provided on the box door, the harm to human body caused by light environment, such as flour mill, can be simulated by opening the curtain, and the harm to human body caused by dark environment, such as coal mine underground, can be simulated by closing the curtain.

BRIEF DESCRIPTION OF THE DRAWINGS

FIG. 1 is a structural schematic diagram of a test apparatus for dust-exposing breath of animals.

In the drawings: 1—constant temperature and humidity test box; 2—powder feeder; 3—dryer; 4—crusher; 5—dust removing device; 6—induced draft fan; 7—exhaust gas storage tank; 8—exhaust gas inlet pipe; 9—dust inlet pipe; 10—exhaust pipe; 11—excrement leakage isolation net; 12—tray; 13—box door; 14—transparent window; 15—curtain; 16—flowmeter; 17—flow control valve; 18—dust concentration monitor; 19—exhaust gas concentration monitor; 20—thermometer; 21—hygrometer.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of the present disclosure.

Embodiment 1

As shown in FIG. 1, this embodiment provides a test apparatus for dust-exposing breath of animals including a constant temperature and humidity test box 1, an exhaust gas supplying device, and a dust conveying device. The constant temperature and humidity test box 1 is internally provided with a test chamber, and is externally provided with a dust inlet communicating with the test chamber. The dust inlet is connected to the dust conveying device via a dust inlet pipe 9, the dust conveying device supplies dust for the test chamber, and the composition, proportion and concentration of the dust should be proportioned according to the simulated environment. A horizontally arranged excrement leakage isolation net 11 is provided in the test chamber, and the excrement leakage isolation net 11 divides the test chamber into an activity area and a cleaning area which are distributed from up to down, that is, a space of the test chamber above the excrement leakage isolation net 11 is the activity area, which is configured for being placed test animals, such as white mice, and a space of the test chamber below the excrement leakage isolation net 11 is the cleaning area, in which a blowing device (not shown) and a tray 12 are arranged. After the supply of dust is stopped, the blowing device can be turned on to raise the dust in the test chamber to avoid a situation that the contact effect between the test animals and the dust is reduced due to deposition of the dust. There is no requirement on the specific position and number of the blowing devices, even the test chamber can be full of the blowing devices as long as the dust in the test chamber can be raised. The wind force of the blowing device does not need to be large, as long as the dust can diffuse in the air. The tray 12 is configured for receiving excrement and urine leaked from the excrement leakage isolation net 11, facilitating the subsequent cleaning. The constant temperature and humidity test box 1 is provided with a box door 13, and the box door 13 is communicated with both the activity area and the cleaning area of the test chamber. On the one hand, the box door 13 is provided to take and put the test animals and the tray 12, and on the other hand, the box door 13 is provided to introduce fresh air and clean the dust in the test chamber for the next test. The blowing device may be a fan, or other blowing machines. In the case that the fan is used as the blowing device, the fan is installed at the bottom of the cleaning area, and the number of fans is set according to the actual needs. In order to ensure that the wind can completely cover the test chamber, the orientations of the fans can be set at multiple angles, such as upward, downward and in other directions. The wind force of the fan does not need to be large, as long as that the dust can be effectively raised and diffused in the air.

Operation principles are as follows:

The box door 13 is opened, the tray 12 and a test animal (such as white mouse, gray mouse) are respectively placed into the cleaning area and the activity area, and then the box door 13 is closed. The dust conveying device is turned on to feed dust with a preset concentration into the test chamber. After the concentration of the dust in the test chamber reaches a corresponding concentration, the feeding of dust is stopped. The blowing device and the constant temperature and humidity test box 1 are turned on. The blowing device raises the dust in the test chamber and diffuses the dust in the air. By means of a control panel of the constant temperature and humidity test box 1, the humidity and temperature in the test chamber are adjusted to reach the preset simulated temperature and humidity. The test animal is taken out of the test chamber every day for measuring the weight and observing eating and activity of the test animal. The test animal is only needed to stay in the test chamber for several hours every day, instead of the whole day, so as to avoid the influence of hypoxia and serious lack of food on the test data. Then, after the above steps are repeated for days, the test animal is taken out of the test chamber for blood drawing, so as to carry out biochemical index assay. The preset concentration of the dust can be preset according to the environment that desires to be simulated, and different concentrations can be set for comparison.

The test apparatus for dust-exposing breath of animals can be used for simulating an underground working environment of a coal mine and evaluating the survival index in the harsh environment in the coal mine. For example, the mixed powder conveyed by the dust conveying device includes coal powder and quartz sand powder, so as to maximally simulate the underground environment of the coal mine. Certainly, the test apparatus for dust-exposing breath of animals may also be used for simulating other environments with dust, such as a flour mill.

In order to simulate the air environment in the environment and explore harm to human body caused by the harmful gas and dust, in this embodiment, as shown in FIG. 1, the constant temperature and humidity test box 1 is externally provided with an exhaust gas inlet communicated with the test chamber. The exhaust gas inlet is connected to an exhaust gas supplying device via an exhaust gas inlet pipe 8, so as to supply exhaust gas mixture into the test chamber, and the composition and proportion of the exhaust gas mixture is needed to be proportioned according to the simulated environment. The blowing device is turned on after the supply of the exhaust gas and the dust is stopped. When the test apparatus for dust-exposing breath of animals is used for simulating the underground working environment of the coal mine, the exhaust gas supplying device provides common gases in the coal mine such as CO, $CO_2$ and nitrogen oxide NOx.

Furthermore, in this embodiment, as shown in FIG. 1, the exhaust gas supplying device includes an exhaust gas storage tank 7 which is filled with the exhaust gas mixture. When the test apparatus for dust-exposing breath of animals is used for simulating the underground environment of the coal mine, the exhaust gas mixture is common gases in the coal mine such as CO, $CO_2$ and nitrogen oxide NOx. A flowmeter 16 and a flow control valve 17 are arranged on the exhaust gas inlet pipe 8 between the exhaust gas storage tank 7 and the exhaust gas inlet, the flowmeter 16 is configured for monitoring the amount of the supplied exhaust gas, and the flow control valve 17 is configured for adjusting the flow rate of the supplied exhaust gas to adjust the amount of the supplied exhaust gas. Preferably, the exhaust gas storage tank 7 is made of stainless steel and prefilled with simulated exhaust gas mixture. The exhaust gas storage tank 7 has a volume of 4 L, and an operating pressure of 6 MPa. An electromagnetic stop valve is arranged at a discharge port of the exhaust gas storage tank 7 and connected to the exhaust gas inlet pipe 8. A DJ2B-type electromagnetic stop valve is employed as the electromagnetic stop valve, which is suitable for various gas path systems to control the opening and closing of gas including opening and closing of general corrosive gases, and has good corrosion resistance and sealing performance.

In this embodiment, as shown in FIG. 1, a dust concentration monitor 18, an exhaust gas concentration monitor 19, a thermometer 20 and a hygrometer 21 are arranged in the test chamber, so as to respectively monitor the dust concentration, the exhaust gas concentration, the temperature and humidity in the test chamber. Preferably, a programmable logic controller PLC can be pre-installed on the constant temperature and humidity test box 1, data from the dust concentration monitor 18, the exhaust gas concentration monitor 19, the thermometer 20, the hygrometer 21 and the flowmeter 16 are collected by edited program in PLC, and the powder feeder 2, the dryer 3, the crusher 4 and the flow control valve 17 are controlled according to the collected data. After all the data are preset on the control panel, the dust concentration, exhaust gas concentration, the temperature and the humidity can be automatically adjusted. Preferably, the dust concentration monitor 18 may employ a SDS036-type industrial powder sensor, which is manufactured based on laser scattering principle, is used for monitoring environment with heavy pollution and high concentration, and has the measuring range of 0-1000 $mg/m^3$. The exhaust gas concentration monitor 19 can measure the exhaust gas with a concentration range of 10-2000 ppm, has a resolution of 1 ppm, a response time of 15 s, and a circuit voltage of less than or equal to 15 VDC. The PLC may employ Mitsubishi FX3U-16MT PLC.

In this embodiment, as shown in FIG. 1, the dust conveying device includes the powder feeder 2, and the crusher 4, an output end of the powder feeder 2 is communicated with a dust inlet pipe 9, the crusher 4 is located above the powder feeder 2, and a powder outlet of the crusher 4 is communicated with a powder container of the powder feeder 2. The powder feeder 2 is a single-cylinder air-borne powder feeder for conveying powder with a carrier gas, and is configured for conveying powdery materials. The common powder feeder can convey powder with the particle size of about 20-250 μm, and has a the error of powder feeding of less than 2%, and the error of repeated powder feeding of less than 1%. Only inert gases such as argon, nitrogen and helium can be used as the carrier gas, and oxygen, hydrogen and other flammable gases cannot be used as the carrier gas. The basic configuration of the powder feeder includes the powder container, a transmission apparatus, a control apparatus, and a gas path system. For example, the powder container of the igood IGS series powder feeder produced by Henan igood Wear-Resisting Technology Co., ltd. is placed at an upper end of the apparatus and is made of plexiglass. The flow rate of the dust is adjusted by a servo-controlled gate valve and PID (Proportional-Integral-Derivative). In the gas path system, an air compressor is used to compress air to enter one end of the gate valve and drive the dust to enter the model together. The opening between the powder feeder 2 and a dust production position is adjusted by means of a servo-controlled PID control valve, so as to control the dust production speed. In the case that the apparatus is used to simulate the underground environment of the coal mine, the coal block and quartz sand need to be crushed by the crusher 4 first, and then the crushed powder is discharged into the powder container of the powder feeder 2 via a powder outlet, and the crushing degree is needed to be between 30 and 300 meshes.

In this embodiment, as shown in FIG. 1, a dryer 3 is connected between the powder feeder 2 and the dust inlet, that is, the dust inlet pipe 9 is further provided with the dryer 3 for pre-drying the dust.

In order to clean the dust in the test chamber conveniently, in this embodiment, as shown in FIG. 1, the constant temperature and humidity test box 1 is provided with an exhaust port communicated with the test chamber. The exhaust port is connected to a dust removing device 5 via an exhaust pipe 10. The dust removing device 5 can exhaust the exhaust gas and remove the dust from the test chamber. During the arrangement of the dust removing device 5, a mechanical dust remover, a wet dust remover, an electro- static dust remover or a bag dust remover is selected according to the actual dust category and budget consider- ation. An outlet end of the dust removing device 5 is connected to the induced draft fan 6 to exhaust gas from the test chamber and out of the dust removing device 5. When the dust removing device 5 and the induced draft fan 6 are turned on, the box door 13 is needed to be opened, such that the air can flow through the box door 13 into the test chamber and then flow out via the exhaust pipe 10, thus forming an airflow to take the dust out of the test chamber. At the same time, the situation that the constant temperature and humidity test box 1 is deformed due to large negative pressure in the test chamber caused by the closing of the box door 13 can be avoided.

In this embodiment, as shown in FIG. 1, the box door 13 is provided with a transparent window 14 for light to penetrate into the activity area and the cleaning area, and a curtain 15 is arranged on the transparent window 14. The dark environment, such as in a coal mine, can be simulated by closing the curtain 15, and the light environment, such as a flour mill, can be simulated by opening the curtain 15.

Furthermore, in this embodiment, as shown in FIG. 1, the constant temperature and humidity test box 1 is an existing constant temperature and humidity box, and the test cham- ber of the constant temperature and humidity test box 1 has a specific dimensions of length×width×height=380 mm×400 mm×520 mm, a volume of 80 L, a temperature control range of 0-60° C., a temperature fluctuation of +/−1° C. and a humidity range of 45-90% RH. The constant temperature and humidity test box 1 belongs to the prior art, which will not be described in detail but will only be introduced simply: a liner, which forms a test chamber, of the constant tem- perature and humidity test box 1 is made of stainless steel, and a housing of the constant temperature and humidity test box 1 is plastic sprayed with carbon steel, which is visually pleasure. The temperature and humidity of the constant temperature and humidity test box 1 are adjustable and controllable, and the control panel is equipped with an LCD (liquid crystal display) digital display. A side of the constant temperature and humidity test box 1 is provided with a spray inlet for controlling humidity, and the liner is internally provided with a heat insulation layer and a heating device, such as a heating rod.

Embodiment 2

Provided is a test method dust-exposing breath of animals by means of the test apparatus dust-exposing breath of animals in Embodiment 1, and as shown in FIG. 1, includes the following steps:

step S1, a box door 13 is opened, a test animal and a tray 12 are placed into an activity area and a cleaning area of a test chamber, respectively, and then the box door 13 is closed.

step S2, a dust conveying device is turned on to introduce dust with a present concentration into the test chamber, the dust conveying device is turned off after the intro- duction is finished, and a blowing device is turned on to raise the dust.

step S3, a temperature and humidity in the test chamber are adjusted to a preset temperature and humidity.

step S4, after reaching a preset test time every day, the box door 13 is opened to take out the test animal, the tray 12 and the dust in the test chamber are cleaned, the test animal taken out of the test chamber is weighed, and the eating and activity conditions of the test animal are observed.

step S5, the test animal and the tray 12 are placed back to the activity area and the cleaning area respectively, steps 1 to 4 are repeated, and after several days, blood of the test animal is drawn for biochemical index assay, thus completing a test cycle.

Furthermore, in this embodiment, as shown in FIG. 1, in step S2, when the dust conveying device is turned on, an exhaust gas supplying device is turned on to introduce exhaust gas mixture with a preset concentration into the test chamber, and after the introduction of each of the dust conveying device and the exhaust gas supplying device is finished, the blowing device is turned on to raise the dust.

Specifically, in this embodiment, as shown in FIG. 1, the white mouse is used as an exemplary test animal to simulate underground environment of the coal mine, including the following steps:

The box door 13 is opened, the white mouse and the tray 12 are respectively placed into the activity area and the cleaning area of the test chamber, and then the box door 13 is closed.

Then, the coal block and the quartz sand are fed into a crusher 4 to be crushed to about 200 meshes, in which a ratio of the coal block to the quartz sand is determined according to the actual site. Afterwards, the mixed powder is intro- duced into a powder container of a powder feeder 2, is blown into a dust inlet pipe 9 by a compressed air source of an air compressor, and then is blown into the test chamber after being dried by a dryer 3. A stop valve of an exhaust gas storage tank 7 is opened, a flow control valve 17 is adjusted according to the monitoring of the flowmeter 16, and the exhaust gas mixture is introduced into the test chamber. When a dust concentration monitor 18 and an exhaust gas concentration monitor 19 respectively monitor that the dust concentration and the exhaust gas concentration in the test chamber reach preset values, the powder conveying of the powder feeder 2 and the exhaust gas conveying of the exhaust gas storage tank 7 are stopped, and the fan is turned on to raise the dust.

Then, the constant temperature and humidity test box 1 is turned on to adjust the temperature and humidity in the test chamber, and when the data monitored by a thermometer 20 and a hygrometer 21 reach preset values, the adjustment of the constant temperature and humidity test box 1 is stopped.

Then, the curtain 15 is closed to simulate the dark environment in the mine. After the white mouse stays in the test chamber for 8 hours every day, the box door 13 is opened to take the mice out, and then the mouse is weighed, and eating and activity conditions of the mouse are observed. The tray 12 is taken out to clean. The induced draft fan 6 and the dust removing device 5 are turned on to exhaust the air in the test chamber and remove the dust. If the air exhaust and dust removal are incompletely, the test chamber can also be cleaned manually.

Finally, the white mouse and the tray 12 are placed back to the activity area and the cleaning area respectively, steps 1 to 4 are repeated, and after 5 days to 7 days, blood of the white mouse is drawn for biochemical index assay, thus completing a test cycle.

The above is only the preferred embodiment of the present disclosure, but the scope of protection of the present disclosure is not limited thereto. Equivalent substitution or change made by those skilled in the art according to the technical solution and inventive concept of the present disclosure within the technical scope disclosed by the present disclosure should be included in the scope of protection of the present disclosure.

What is claimed is:

1. A test apparatus for dust-exposing breath of animals, comprising a constant temperature and humidity test box internally provided with a test chamber, wherein the constant temperature and humidity test box is provided with a dust inlet communicated with the test chamber, and the dust inlet is connected to a dust conveying device; the test chamber is internally provided with an excrement leakage isolation net separating the test chamber into a cleaning area and an activity area configured for activities of the animals; the activity area and the cleaning area are distributed from up to down; and a blowing device configured for blowing dust and a tray configured for receiving excrement and urine are arranged in the cleaning area, and the constant temperature and humidity test box is provided with a box door communicated with the activity area and the cleaning area.

2. The test apparatus for dust-exposing breath of animals according to claim 1, wherein the constant temperature and humidity test box is provided with an exhaust gas inlet which is communicated with the test chamber and the exhaust gas inlet is connected to an exhaust gas supplying device.

3. The test apparatus for dust-exposing breath of animals according to claim 2, wherein the exhaust gas supplying device includes an exhaust gas storage tank filled with exhaust gas mixture, and a flowmeter and a flow control valve are connected between the exhaust gas storage tank and the exhaust gas inlet in sequence.

4. The test apparatus for dust-exposing breath of animals according to claim 3, wherein a dust concentration monitor, an exhaust gas concentration monitor, a thermometer and a hygrometer are arranged in the test chamber.

5. The test apparatus for dust-exposing breath of animals according to claim 4, wherein the dust conveying device comprises a powder feeder and a crusher located above the powder feeder, a powder outlet of the crusher is communicated with a powder container of the powder feeder.

6. The test apparatus for dust-exposing breath of animals according to claim 5, wherein a dryer is connected between the powder feeder and the dust inlet.

7. The test apparatus for dust-exposing breath of animals according to claim 1, wherein the constant temperature and humidity test box is provided with an exhaust port which is communicated with the test chamber and the exhaust port is connected to a dust removing device.

8. The test apparatus for dust-exposing breath of animals according to claim 1, wherein the box door is provided with a transparent window configured for light to penetrate into the activity area and the cleaning area, and a curtain is arranged on the transparent window.

9. A test method for dust-exposing breath of animals by means of the test apparatus for dust-exposing breath of animals according to claim 1, comprising following steps:
   step S1: opening the box door, placing a test animal and the tray in the activity area and the cleaning area of the test chamber, respectively, and closing the box door;
   step S2: turning on the dust conveying device to introduce dust with a preset concentration into the test chamber, turning off the dust conveying device after introduction is finished, and turning on the blowing device to raise the dust;

step S3: adjusting a temperature and a humidity in the test chamber to a preset temperature and a preset humidity;
   step S4: after reaching a preset test time every day, opening the box door to take the test animal out, cleaning the tray and the dust in the test chamber, weighing the test animal taken out, and observing eating and activity conditions of the test animal; and
   step S5: repeating steps S1 to S4, drawing blood of the test animal after days for biochemical index assay, and completing a test cycle.

10. The test method for dust-exposing breath of animals according to claim 9, wherein, in step S2, when the dust conveying device is opened, an exhaust gas supplying device is turned on to introduce exhaust gas mixture with a preset concentration into the test chamber, and after introduction of each of the dust conveying device and the exhaust gas conveying device is finished, the blowing device is turned on to raise the dust.

11. The test method for dust-exposing breath of animals according to claim 9, wherein the constant temperature and humidity test box is provided with an exhaust gas inlet which is communicated with the test chamber and the exhaust gas inlet is connected to an exhaust gas supplying device.

12. The test method for dust-exposing breath of animals according to claim 11, wherein the exhaust gas supplying device includes an exhaust gas storage tank filled with exhaust gas mixture, and a flowmeter and a flow control valve are connected between the exhaust gas storage tank and the exhaust gas inlet in sequence.

13. The test method for dust-exposing breath of animals according to claim 12, wherein a dust concentration monitor, an exhaust gas concentration monitor, a thermometer and a hygrometer are arranged in the test chamber.

14. The test method for dust-exposing breath of animals according to claim 13, wherein the dust conveying device comprises a powder feeder and a crusher located above the powder feeder, a powder outlet of the crusher is communicated with a powder container of the powder feeder.

15. The test method for dust-exposing breath of animals according to claim 14, wherein a dryer is connected between the powder feeder and the dust inlet.

16. The test method for dust-exposing breath of animals according to claim 13, wherein in step S2, when the dust conveying device is opened, the exhaust gas supplying device is turned on to introduce exhaust gas mixture with a preset concentration into the test chamber, and after introduction of each of the dust conveying device and the exhaust gas conveying device is finished, the blowing device is turned on to raise the dust.

17. The test method for dust-exposing breath of animals according to claim 11, wherein in step S2, when the dust conveying device is opened, the exhaust gas supplying device is turned on to introduce exhaust gas mixture with a preset concentration into the test chamber, and after introduction of each of the dust conveying device and the exhaust gas conveying device is finished, the blowing device is turned on to raise the dust.

18. The test method for dust-exposing breath of animals according to claim 12, wherein in step S2, when the dust conveying device is opened, the exhaust gas supplying device is turned on to introduce exhaust gas mixture with a preset concentration into the test chamber, and after introduction of each of the dust conveying device and the exhaust gas conveying device is finished, the blowing device is turned on to raise the dust.

19. The test method for dust-exposing breath of animals according to claim 9, wherein the constant temperature and humidity test box is provided with an exhaust port which is communicated with the test chamber and the exhaust port is connected to a dust removing device.

20. The test method for dust-exposing breath of animals according to claim 9, wherein the box door is provided with a transparent window configured for light to penetrate into the activity area and the cleaning area, and a curtain is arranged on the transparent window.

\* \* \* \* \*